Figure 1:
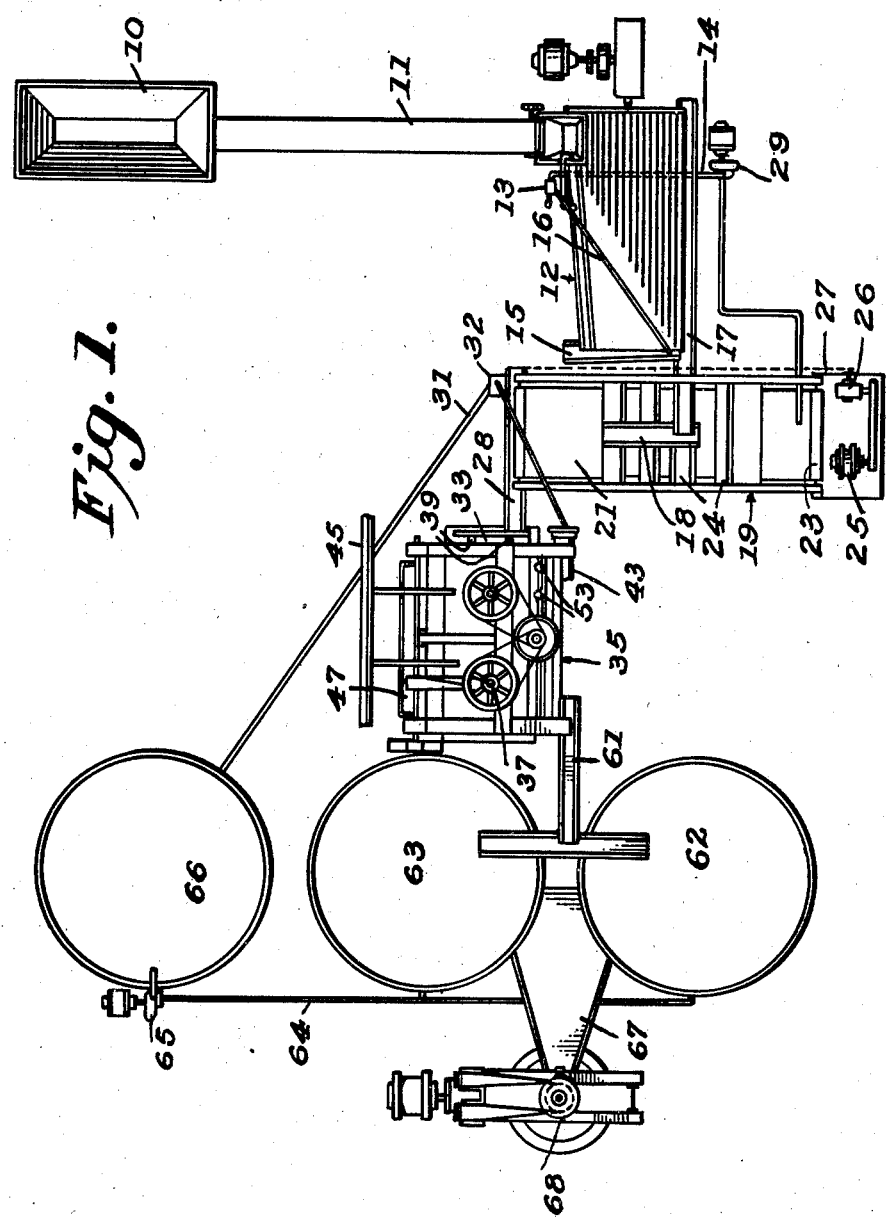

Aug. 25, 1936.   H. P. HOOD   2,052,227
PROCESS FOR THE PREPARATION OF SILICA FOR GLASS BATCHES
Filed June 27, 1934   5 Sheets-Sheet 3

Inventor
Harwent Hood

Attorney

Aug. 25, 1936. H. P. HOOD 2,052,227
PROCESS FOR THE PREPARATION OF SILICA FOR GLASS BATCHES
Filed June 27, 1934 5 Sheets—Sheet 5

Inventor
Harrison P. Hood
by
Attorney

Patented Aug. 25, 1936

2,052,227

UNITED STATES PATENT OFFICE 2,052,227

PROCESS FOR THE PREPARATION OF SILICA FOR GLASS BATCHES

Harrison P. Hood, Corning, N. Y., assignor to Corning Glass Works, Corning, N. Y., a corporation of New York Application June 27, 1934, Serial No. 732,729

5 Claims. (Cl. 209—2)

This invention relates to the preparation of silica for glass batches and more particularly to the removal of impurities therefrom.

It is well known that the presence of iron in glass, even in exceedingly small amounts, causes absorption of ultraviolet radiations and particularly of those radiations which have a beneficial biological effect. In my prior Patent 1,830,904, I have described a method of making a glass which, in a thickness of 2 mm., will have a permanent transmission of over 50% of the light rays which have a wave length of 302 millimicrons. Such a glass must contain less than .005% of iron calculated as ferric oxide. In order to attain such a low iron content in the finished glass and since an appreciable amount of iron is accumulated from the refractories during melting, it is necessary that the glass constituents and particularly the silica, which is the major constituent, should have an iron content considerably less than this and preferably not greater than .001% $Fe_2O_3$.

Recent discoveries indicate that quartz is the purest form of natural silica and that it is therefore particularly desirable for glass manufacture. However, the purest quartz usually contains minute amounts of impurities including iron-bearing materials. Moreover, quartz must be pulverized before it can conveniently be used for glass manufacture and the usual methods of pulverization introduce metallic iron into the pulverized silica thereby further increasing the total iron content. Consequently, the purest quartz, after it has been pulverized by the usual methods, will usually possess a total iron content equal to about .015% of ferric oxide.

Known methods of purifying silica, such as magnetic separation and acid washing, either give insufficient purification or are too expensive to be used economically in the manufacture of glass which is transparent to ultraviolet radiation.

The object of the present invention is to remove from silica those impurities which cause absorption of ultraviolet radiations when such silica is used as a constituent of glass.

Among the features embodied in this invention is the employment of a flotation process whereby the iron is separated from the silica and floated off as waste. Other features will appear as the description proceeds.

Flotation methods have been used to purify minerals and metals by separating them more or less completely from their ores but insofar as I am aware the process of flotation has never been employed in the purification of silica to remove iron and more particularly to effect the high degree of purification of silica which is essential for the manufacture of ultraviolet transmission glass.

I have discovered that by means of flotation, using special flotation oils as will later be described, I can remove metalic iron and iron-bearing materials from pulverized silica, thereby decreasing the total iron content to about .004% as ferric oxide. I have further found that by using a concentration table of the jig type, commonly known as a Wilfley table, in series with a flotation unit, I can still further decrease the iron content of pulverized silica to the exceedingly low value of about .001% as ferric oxide.

Figure 2:
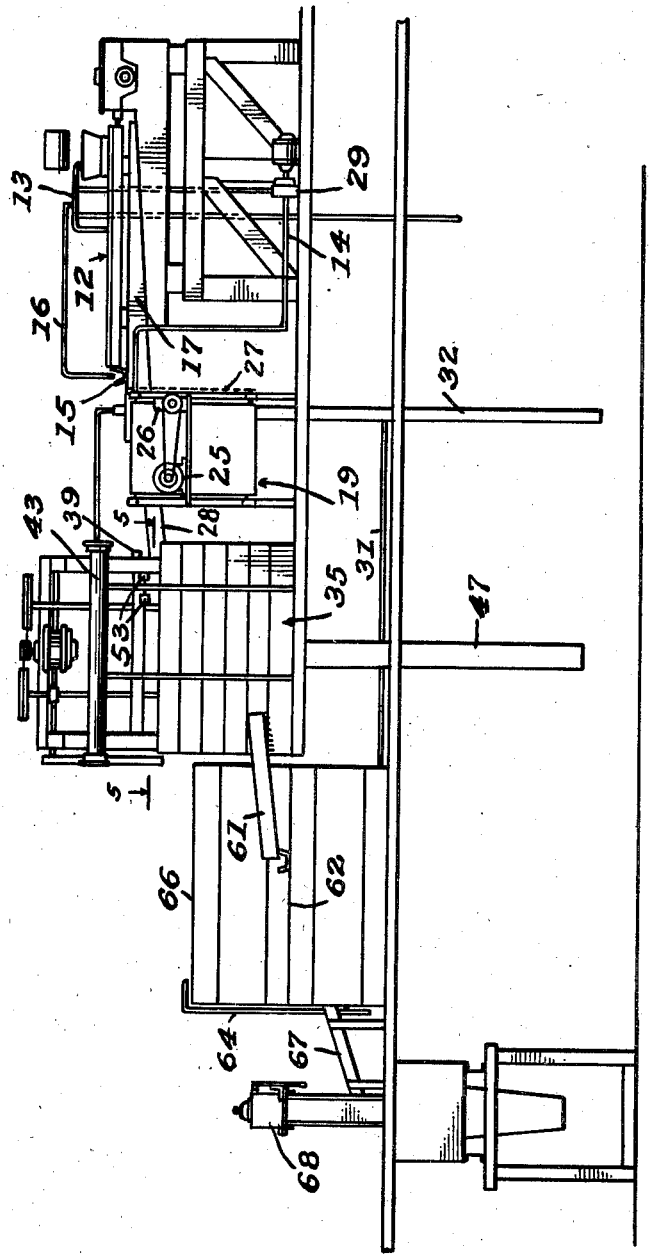
Figure 3:
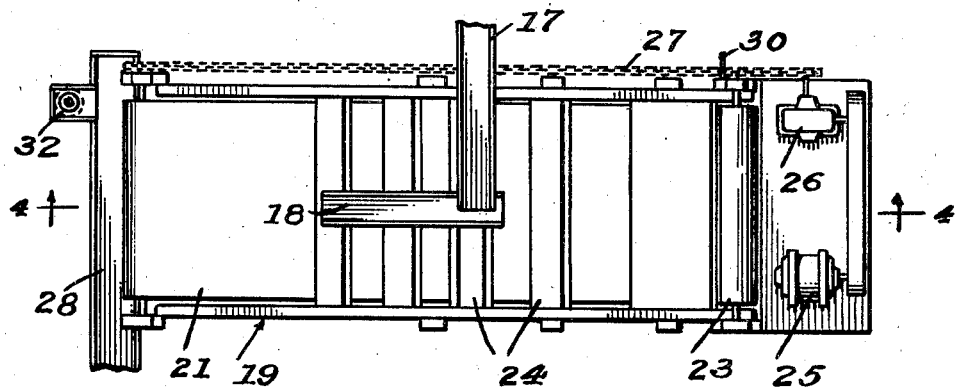
Figure 4:
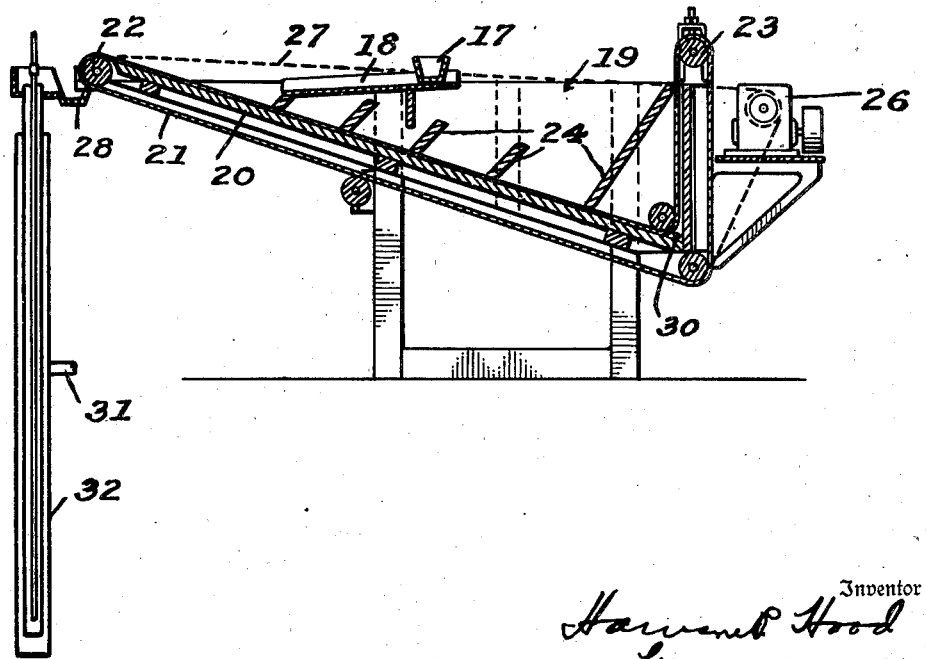
Figure 5:
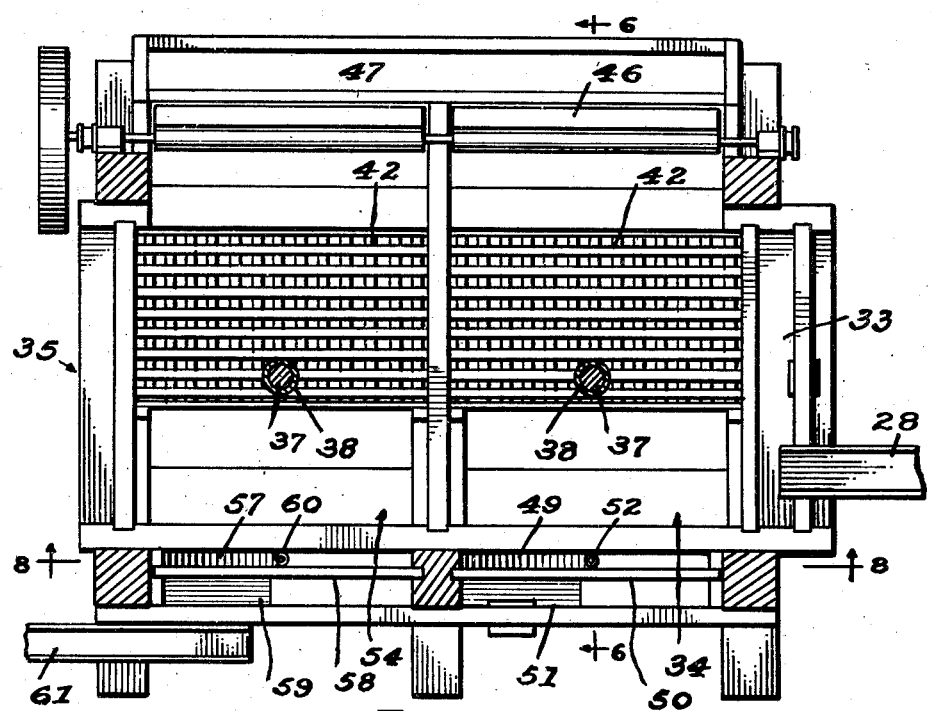
Figure 7:
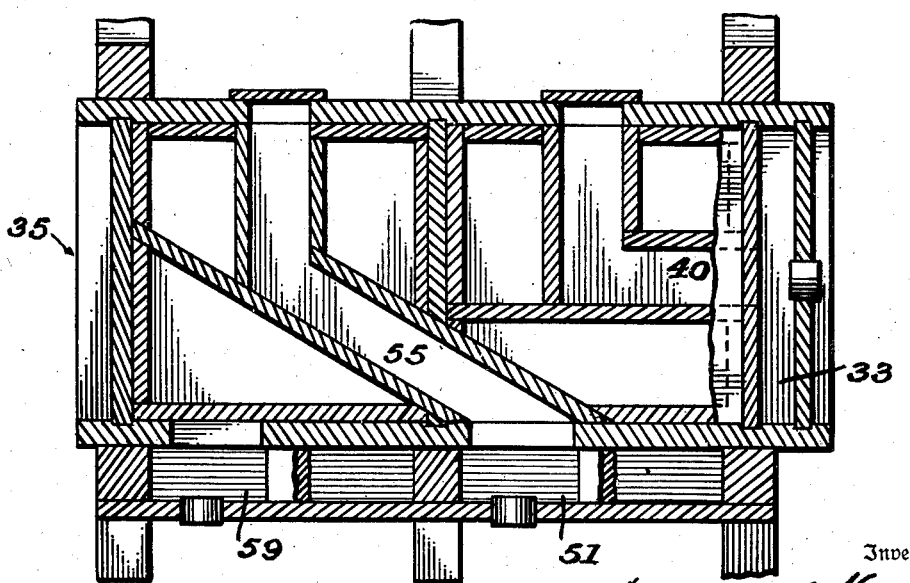
Figure 6:
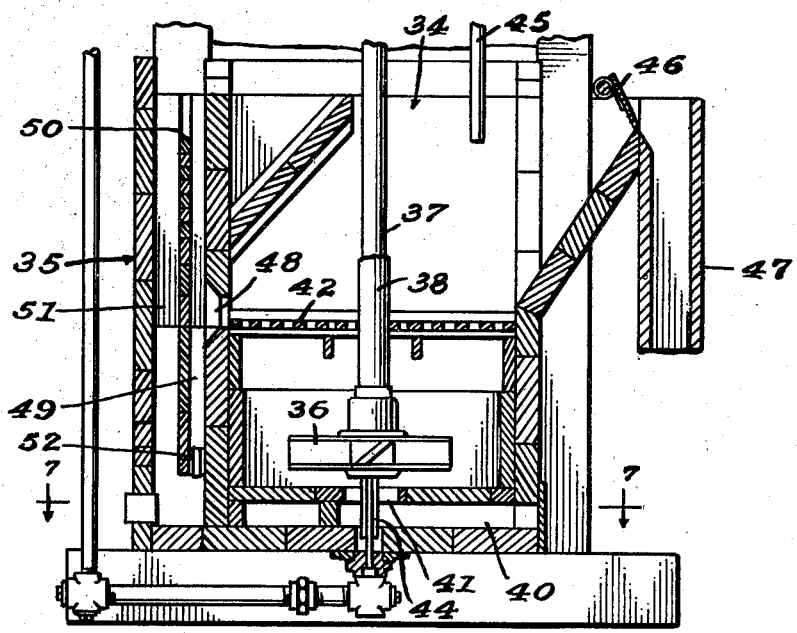
Figure 8:
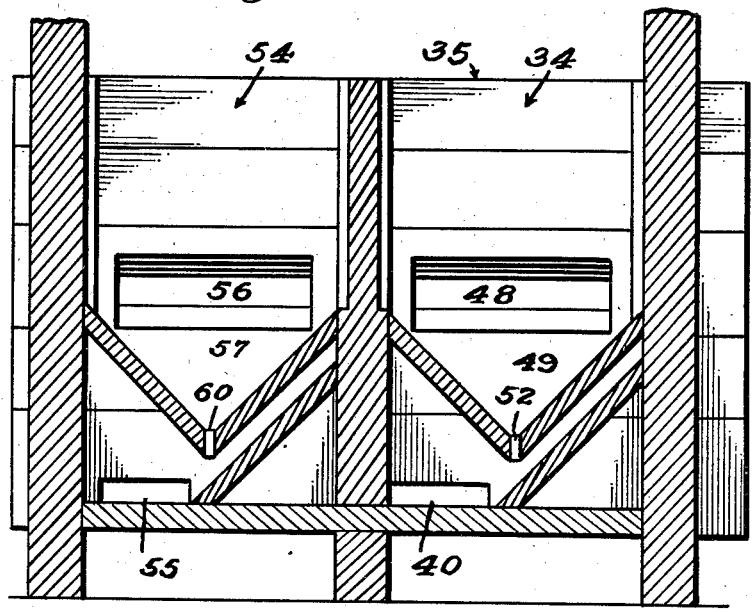

My invention further resides in the novel construction, combination and arrangement of parts to be more fully hereinafter described, claimed and illustrated in the accompanying drawings in which:

Fig. 1 is a plan view of the complete apparatus;
Fig. 2 is an elevation of the complete apparatus;
Fig. 3 is a plan view of the settling tank;
Fig. 4 is a longitudinal vertical section of the settling tank taken on the line 4—4 of Fig. 3;
Fig. 5 is an enlarged horizontal sectional view of the flotation unit taken on the line 5—5 of Fig. 2;
Fig. 6 is an enlarged vertical sectional view of the flotation unit on the line 6—6 of Fig. 5;
Fig. 7 is an enlarged horizontal sectional view of the flotation unit taken on the line 7—7 of Fig. 6; and
Fig. 8 is an enlarged longitudinal sectional view of the flotation unit taken on the line 8—8 of Fig. 5.

In the drawings, a storage bin 10, containing pulverized silica, is suitably located above a conveyor belt 11 which carries the silica up to a concentration table 12 of the jig type, commonly known as a Wilfley table. The table is provided with a water feed 13 which is connected to a suitable source of supply (not shown) and is located near the delivery end of the conveyor belt. A return pipe 14 leads up to and joins with the water feed 13 and is connected through a suitable pump 29 with the settling tank, as will be more fully hereinafter described. A waste trough 15 is supported at one end of the table to dispose of impurities separated from the silica by the action of the table and supported at one side of the table is a delivery trough 17 for conveying the washed silica from the table to a settling tank 19.

As shown in Figs. 3 and 4, the settling tank 19 comprises a rectangular wooden tank having an inclined floor 20 over which runs a movable endless belt of heavy fabric 21. This belt is adapted to move along the inclined floor 20 and over the roll 22 at one end whence it returns beneath the floor and re-enters the tank at the opposite end over the roll 23. In its passage through the tank, the belt 21 passes beneath a series of inclined wooden baffles 24, the ends of which are supported by the side walls of the tank. The belt is driven by means of a motor 25, a gear reduction unit 26 and a chain 27. A feed trough 18 is supported above the tank in position to receive the silica from the delivery trough 17 and deliver it into the tank above the uppermost baffle 24. Supported at the delivery end of the settling tank 19 below the belt 21 is a delivery trough 28 into which the partially purified silica is deposited. A glass pump or air lift 32 which consists of three concentric glass tubes, the outer one of which contains the liquid which is to be lifted and the inner one of which carries a slow stream of compressed air nearly to the bottom of the outer tube, is arranged to draw acidulated water from a glass pipe line 31, to be described hereinafter, and to discharge it into the delivery trough 28 so as to wash the silica deposited by the belt 21 into a flotation unit 35.

The flotation unit 35 (shown in Figs. 5, 6, 7 and 8) is a modification of the type commonly employed in metallurgical processes and is composed of two cells 34 and 54 of similar construction. These cells are provided with feed boxes 33 and 51 for receiving the silica, above which are located oil reservoirs 39 and 53, respectively (Figs. 1 and 2), for controlling the addition of flotation oils to the silica. The feed boxes communicate with the floor openings 41 (Fig. 6) by means of channels 40 and 55 (Fig. 7), and directly above these floor openings are impellers 36 and grids 42 (Figs. 6 and 5). A rotating paddle 46 serves to remove the waste from the top of the liquid in the cells 34 and 54 and passes it to a waste trough 47 through which the waste is discharged. Delivery ports 48 and 56 (Figs. 6 and 8) serve to conduct the silica from the opposite side of the cells into weir boxes 51 and 59 (Figs. 5 and 7), the latter one of which connects with a delivery trough 61 (Fig. 5) which leads to a pair of settling tanks 62 and 63 (Fig. 1). These tanks are connected by means of an inclined trough 67 to a centrifugal dryer 68 and are connected by means of a glass pipe line 64 to an acid tank 66. The glass pipe line 31 extends from the bottom of the acid tank 66 to the glass pump 32.

In practicing my invention the pulverized silica which is to be purified is conveyed from the bin 10 by the conveyor belt 11 to the concentration table 12. The silica on being delivered to the table is mixed with water from the water feed 13 and the return pipe 14 and spreads over the table in the usual manner. The most desirable rate of delivery is approximately 500 pounds of silica and 200 gallons of water per hour. The motion of the table and the flow of water and silica over the ribs of the table cause the larger particles of metallic iron and iron-bearing materials by virtue of their greater density to be separated from the silica and to be discharged into the waste receiving trough 15 which is continuously washed out by a stream of water from a pipe 16 which leads from the water supply 13. The silica and water mixture together with such impurities as may remain after the jigging operation flows into the delivery trough 17 and thence into the feed trough 18 of the settling tank 19.

As the silica and water mixture enters the tank 19, the silica settles and is deposited on the moving belt 21 by means of which it is carried above the level of the water contained in the tank and deposited in the delivery trough 28. The water remaining in the tank 19 after the removal of the silica overflows through the pipe line 14 and is returned to the table 12 by means of the pump 29. The return of the wash water to the table prevents undue loss of fine silica which may remain suspended in the water during its passage through the settling tank. In order to prevent fine silica from accumulating at the lowermost corner of the tank 19, a pipe 30 (Fig. 4) is provided through which a small amount of water or air may be forced to promote a gentle agitation.

A stream of water containing about 1% of hydrochloric acid is introduced into the trough 28 through the glass pipe line 31 by means of the glass pump 32 and carries the silica into the feed box 33 of the first cell 34 of the flotation unit 35. This flotation unit differs from the ordinary flotation units in that all iron parts are eliminated or are shielded from the corrosive action of the acid and the abrasive action of the silica. This is accomplished by casting the impellers 36 of an alloy of aluminum and silicon, encasing the drive shafts 37 of the impellers in non-ferrous materials such as rubber tubes 38 (Fig. 6) and counter-sinking and covering all bolts and screw heads with a protective coating such as plastic wood.

The two reservoirs 39, located above the feed box 33 of the first cell 34, contain non-aliphatic flotation oils, such as pine oil and "Aerofloat No. 15". These oils each drip at the rate of about 50 drops per minute for about 500 pounds of silica per hour into the feed box 33 where they mix with the inflowing silica and water. The successful operation of my process depends largely upon these oils and their function and action will be described later. The inflowing mixture of acidulated water, silica and flotation oils passes from the feed box 33 beneath the floor of the cell 34 through the channel 40 and is drawn into the cell through the floor opening 41 and forced upwardly through the grid 42 by the suction of the impeller 36. Since the level of the liquid in the feed box 33 never rises above the top of the channel 40, air is drawn into the flotation unit along with the mixture by the suction created by the impeller 36. More air is admitted if desired from a pressure tank 43 (Figs. 1 and 2) through an auxiliary air jet 44 (Fig. 6). I have found, however, that for ordinary purposes an ample amount of air is drawn into the unit by the impeller without requiring the use of the auxiliary supply.

I have found that by maintaining the temperature of the mixture at about 50° C. I can promote the most efficient action of the acid and oils in removing iron impurities from silica and hence I admit steam to the interior of the flotation unit through a steam supply pipe 45 (Fig. 6) whose discharge end is submerged slightly below the level of the liquid in the cell 34.

The agitation of the impeller combined with the action of the flotation oils creates a froth which rises to the surface of the liquid carrying the iron impurities with it. Although there are many flotation oils and flotation reagents which are used for flotation processes, many of them are not suitable for my process. I have found that aliphatic reagents, such as olein acid, will not accomplish a purification of silica sufficient for the purpose of this invention. My researches have shown that of the non-aliphatic oils those that contain sulfur, such as the sulfur-phosphorous derivatives of cresol or cresylic acid described in Patent No. 1,593,232, are the most suitable of all for my purpose. An oil of this type, sold under the trade-name "Aerofloat No. 15", when used in conjunction with pine oil, will cause a 43% greater separation of the total iron contained in the best quality of pulverized quartz than will oleic acid. In this process the pine oil is used as a frothing agent and serves mainly to create a froth. It is thought that the "Aerofloat No. 15" coats the metallic particles while the silica particles remain uncoated. The generally accepted theory of flotation teaches that the film covered froth bubbles adhere to the film coated mineral or metallic particles and float them to the surface.

The impurities which are floated to the surface of the liquid in the cell 34 are removed therefrom and discarded by the action of the revolving paddle 46, the blade of which periodically sweeps the accumulated froth and waste from the surface of the solution into the waste trough 47. In the present process these impurities constitute the gangue which, contrary to the usual practice, is floated off as waste. The silica, together with the acidulated water in which it is suspended, flows through the port 48 into a compartment 49 in which its level rises until it flows over a partition or dam 50 and falls into the weir box 51. It will thus be seen that the level of the liquid in the cell 34 is maintained at the level of the liquid in the compartment 49. A vent 52 in the bottom of the compartment 49 is so adjusted as to allow the continuous discharge of any silica which may settle at this point into the weir box 51. As the acidulated mixture of water and silica enters the weir box 51, the flotation oils (pine oil and "Aerofloat No. 15") are added as before at the rate of about fifty drops of each per minute for about 500 pounds of silica per hour from suitable reservoirs 53. The weir box 51 serves as the feed box for the second cell 54 of the flotation unit, and is so arranged that the silica-acid-oil mixture enters the channel 55 from which it, together with air, is drawn into the cell 54 by the suction of an impeller (not shown). More air may be admitted if desired from the pressure tank 43 through an auxiliary air jet (not shown).

The cell 54 of the unit is identical in construction and operation with the first cell 34 and its purpose is to remove any metallic impurities which may have escaped removal in the first cell. As in the first cell, steam is admitted from the steam supply pipe 45 in an amount sufficient to maintain the temperature of the liquid at approximately 50° C. while the contents of the second cell are agitated by its impeller. Again the combined action of the impeller and the flotation oils creates a froth which floats such iron impurities as may have escaped removal in the first cell to the surface so that the blade of the paddle 46 which extends across both cells will periodically sweep the froth and waste which accumulates on the surface of the liquid in the cell 54 over the side and into the waste trough 47. The purified silica which is now practically free from metallic impurities flows together with the acidulated water through a port 56 into a compartment 57 in which it rises and flows over a dam 58 into another weir box 59. Like the vent 52 in the bottom of the compartment 49, a vent 60 in the bottom of the compartment 57 is so adjusted as to permit any silica which may have settled at this point to enter the weir box 59. Leaving the weir box 59, the liquid mixture flows into the delivery trough 61 and is conducted to settling tanks 62 and 63 (Fig. 1) where the silica settles to the bottom and leaves the acidulated water as supernatant liquor.

The acidulated water is periodically drawn from the settling tanks 62 and 63 through a glass pipe line 64 and, by means of a pump 65, is stored in the acid tank 66 where sufficient fresh hydrochloric acid is added to renew its strength to about 1% HCl. The acid solution from the tank 66 is drawn off through the glass pipe line 31 by means of the glass pump 32 and is fed continuously into the trough 28. It will thus be seen that the acid solution passes through a complete circuit and is repeatedly used. The silica remaining in the settling tanks 62 and 63, after the supernatant liquor has been drawn off, is shovelled with wooden scoops into an inclined trough 67 from which it flows into the centrifugal drier 68. Here the silica is rinsed with a spray of fresh water while being centrifuged and after this treatment contains about 5% of moisture and not over .001% of $Fe_2O_3$ in which condition it is particularly suitable for use in the preparation of batches for ultraviolet transmitting glasses. In preparing such batches the purified silica is weighed and mixed in the manner customary for the preparation of glass batches.

From the above description it will be noted that I have reversed the usual floatation process in that I remove the purified silica at the place where it is customary to remove the gangue.

My process is distinct from prior methods of treating iron ores and the like wherein iron and other metals are separated from silica and other impurities. Such prior methods are not at all suitable for my purpose and cannot accomplish the almost quantitative separation of iron from silica which is necessary in the preparation of silica which is to be used for the manufacture of ultraviolet transmitting glasses. In prior methods of purifying iron ores by flotation, the best possible purification will leave a few percent of iron remaining in the silica, which is considered of no account, but in my process only a residuum of not more than a few thousandths of a percent of iron is permissible. This complete separation of iron from silica is possible with my process, due to the novel combination of steps therein and the use of special flotation reagents comprising non-aliphatic flotation oils and preferably pine oil and a sulfur-phosphorous derivative of cresol.

I have found that a satisfactory purification can be obtained by using a flotation unit employing two cells, but it is to be understood that I do not limit myself in this respect, since it might be found desirable to use more or less than two cells depending on the amount of impurities to be removed and the degree of purification desired.

By my process above described, I have successfully purified both quartz and fine sand and thereby demonstrated that silica other than quartz can be purified by treating it as above described, provided it is first finely pulverized.

Although I prefer to treat the silica on the concentration table before passing it into the flotation unit equally good results have been obtained by passing the silica through the flotation unit before treating it on the concentration table.

Consequently, I do not wish to be restricted to the specific construction and arrangement shown and described herein, which is only illustrative of the preferred embodiment of my process.

Furthermore, although in the foregoing I have referred to hydrochloric acid as the acidulating agent, I do not wish to be restricted solely to its use, since many other acids have given satisfactory results.

While in the foregoing there has been shown and described the preferred embodiment of my invention, it is to be understod that minor changes in the details of construction, combination and arrangement of parts may be resorted to without departing from the spirit and scope of the invention as claimed.

Having thus described my invention, what I claim is:

1. The method of preparing silica for use in glass batches, which includes introducing the silica into an acid solution, adding thereto a flotation oil comprising a sulphur derivative of cresol, agitating the solution in a flotation apparatus to float off the iron impurities and drying the silica.

2. The method of preparing silica for use in glass batches, which includes introducing the silica into an acid solution, adding a flotation oil comprising a sulphur derivative of cresol thereto, heating the solution, agitating the heated solution in a flotation apparatus to float off the iron impurities and drying the silica.

3. The method of preparing silica for use in glass batches, which includes pulverizing the silica, washing the silica on a concentration table to remove iron impurities therefrom, introducing the silica into an acid solution containing a sulphur derivative of cresol, agitating the solution in a flotation apparatus to remove the residual iron impurities which remain after the concentration treatment and drying the silica.

4. The method of preparing silica for use in glass batches, which includes pulverizing the silica, washing the silica on a concentration table to remove iron impurities therefrom, introducing the silica into an acid soluton containing pine oil and a sulfur derivative of cresol, agaitating the solution in a flotation apparatus to remove residual iron impurities which remain after the concentration treatment and drying the silica.

5. The method of preparing silica for use in glass batches, which includes pulverizing the silica, washing the silica on a concentration table to remove iron impurities therefrom, introducing the silica into an acid solution containing pine oil and a sulfur derivative of cresol, heating the solution, agitating the heated solution in a flotation apparatus to remove residual iron impurities which remain after the concentration treatment and drying the silica.

HARRISON P. HOOD.